(12) United States Patent
Moninski (10) Patent No.: US 9,871,354 B2
(45) Date of Patent: Jan. 16, 2018

(54) ENCLOSURE WITH LID COUNTERWEIGHT ASSEMBLY

(71) Applicant: S&C Electric Company, Chicago, IL (US)

(72) Inventor: Joseph P. Moninski, Arlington Heights, IL (US)

(73) Assignee: S&C Electric Company, Chicago, IL (US)

( * ) Notice: Subject to any disclaimer, the term of this patent is extended or adjusted under 35 U.S.C. 154(b) by 0 days.

(21) Appl. No.: 14/680,437

(22) Filed: Apr. 7, 2015

(65) Prior Publication Data

US 2016/0344168 A1 Nov. 24, 2016

Related U.S. Application Data

(60) Provisional application No. 61/978,012, filed on Apr. 10, 2014.

(51) Int. Cl.
| | |
|---|---|
| *H02B 1/38* | (2006.01) |
| *H02B 1/30* | (2006.01) |
| *E02D 29/14* | (2006.01) |
| *B65D 43/24* | (2006.01) |

(52) U.S. Cl.
CPC ............ *H02B 1/306* (2013.01); *B65D 43/24* (2013.01); *E02D 29/14* (2013.01); *H02B 1/38* (2013.01)

(58) Field of Classification Search
CPC .. E02D 29/14; H02B 1/38; H02B 1/50; H02B 1/306; B65D 43/24; E05D 13/14
USPC .... 312/319.2, 319.4, 323, 325, 27, 196, 290
See application file for complete search history.

(56) References Cited

U.S. PATENT DOCUMENTS

| | | | | |
|---|---|---|---|---|
| 1,447,060 | A | * 2/1923 | Boughton | E05D 15/262 16/200 |
| 1,520,177 | A | * 12/1924 | Dickason | E05D 15/403 16/374 |
| 1,839,045 | A | * 12/1931 | Moray | E05D 15/463 160/189 |
| 2,024,724 | A | 12/1935 | Eager et al. | |
| 2,886,394 | A | * 5/1959 | Snyder | E06B 3/482 126/340 |
| 4,134,629 | A | * 1/1979 | Hansen | A47B 46/005 312/246 |
| 4,383,721 | A | * 5/1983 | Knaack | E05F 1/1091 217/60 R |
| 4,467,932 | A | 8/1984 | Dabich | |

FOREIGN PATENT DOCUMENTS

GB 556870 10/1943

OTHER PUBLICATIONS

The International Bureau of WIPO, International Preliminary Report on Patentability for International Application No. PCT/US2015/025019 dated Oct. 20, 2016.

* cited by examiner

*Primary Examiner* — James O Hansen
(74) *Attorney, Agent, or Firm* — Lorenz & Kopf, LLP (57) ABSTRACT

An enclosure includes a body portion, a top portion having a lid component configured to rotate with respect to the body portion to provide access to an interior compartment of the enclosure, and a counterweight assembly coupled between the lid component and the body portion. The counterweight assembly is configured such that the force required to rotate the lid component from the enclosure's closed position to its full-open position is substantially constant.

17 Claims, 9 Drawing Sheets

ENCLOSURE WITH LID COUNTERWEIGHT ASSEMBLY

CROSS-REFERENCE TO RELATED APPLICATIONS

This application claims the benefit of U.S. Provisional Application No. 61/978,012 filed on Apr. 10, 2014, the entire disclosure of which is incorporated herein by reference.

TECHNICAL FIELD

The technical field generally relates to enclosures, such as pad-mounted enclosures, and more particularly relates to systems and methods for providing access to the interior of such enclosures.

BACKGROUND

Power distribution systems often utilize underground distribution ("UD") switchgear enclosures that include one or more compartments designed to house and protect the various electrical components used in conjunction with such systems, including load-interrupter switches, fault interrupters, cabling, and the like. One type of such switchgear enclosure is the "pad-mounted" enclosure, which typically includes a lockable metal enclosure mounted on a concrete pad in an outdoor location. Enclosures of this type may be configured to provide access to internal components via one or more removable panels, doors, and lids.

Known enclosures of the type described above may be unsatisfactory in a number of respects. For example, in the case of enclosures that incorporate a hinged roof, the roof component or components may be difficult to lift, particularly by a single individual. Similarly, such hinged roofs may be difficult to hold in the open position (e.g., via multiple prop-rods) and/or may be difficult to unlatch and close by a single individual. In addition, access to the enclosure may be further impeded by the accumulation of rain, snow, or ice.

Accordingly, there is a need for improved enclosure systems that are easy to open, lock in place, and close. Other desirable features and characteristics of the present invention will become apparent from the subsequent detailed description and the appended claims, taken in conjunction with the accompanying drawings and the foregoing technical field and background.

DESCRIPTION OF THE DRAWINGS

The exemplary embodiments will hereinafter be described in conjunction with the following drawing figures, wherein like numerals denote like elements, and wherein.

DETAILED DESCRIPTION

An enclosure in accordance with one embodiment includes a body portion, a top portion including a lid component configured to rotate with respect to the body portion to provide access to an interior compartment of the enclosure, and a first counterweight assembly coupled between the lid component and the body portion. The counterweight assembly is configured such that a force required to rotate the lid component about a rotational axis from a closed position to a full-open position is substantially constant.

A counterweight assembly for an enclosure having a body portion and a user-actuable lid. component in accordance with one embodiment includes a first class lever component having a first end, a second end, and a fulcrum rigidly coupled to the body portion; a first linkage coupled between the lid component and the first end of the first class lever component; and a counterweight mass coupled, through a second linkage, to the second end of the first class lever component. The counterweight mass, the first linkage, the second linkage, and the first class lever component are configured such that a force required to rotate the lid component from a closed position to a full-open position is substantially constant.

A counterweight assembly in accordance with one embodiment includes a first link having a first end and a second end, wherein the first end is rotatably coupled to the lid component at a first pivot; a second link having a first end and a second end, wherein the first end is rotatably coupled to the second end of the first link at a second pivot, and the second link is rotatably coupled to the body portion between its first end and its second end at a third pivot; a third link having a first end and a second end, wherein the first end is rotatably coupled to the second end of the second link at a fourth pivot; a counterweight mass; and a fourth link having a first end, a second end, and a fifth pivot therebetween, wherein the first end is coupled to the counterweight mass, the second end is coupled to the body potion at a sixth pivot, and the second end of the third link is rotatably coupled to the fourth link at the fifth pivot. The first link, the second link, the third link, the counterweight mass, and the fourth link are configured such that a force required to rotate the lid component about a rotational axis from a closed position to a full-open position is substantially constant.

The subject matter described herein generally relates to an improved enclosure access system incorporating a counterweight assembly that facilitates the easy opening, locking, and closing of the lid or "roof" portion of an enclosure. In this regard, there is no intention to be bound by any expressed or implied principle presented in the preceding technical field, background or the following detailed description. It will be understood that the drawing figures are not necessarily drawn to scale and may be referred to herein, without loss of generality, as "isometric" (as opposed to "perspective") drawings even when such drawings are not strictly isometric, but are otherwise axonometric as is known in the art.

An exemplary enclosure and associated counterweight assembly will now be described in conjunction with a series of isometric exterior views and their associated cross-sectional views which, considered together, depict the various stages of a enclosure progressing from a closed position to a full-open position. More particularly, FIGS. 1, 3, 5, and 7 are isometric views of an exemplary enclosure at various stages, while FIGS. 2, 4, 6, and 8 are partial cross-sectional views depicting the movement of an exemplary counterweight assembly provided within the enclosure.

Figure 1:
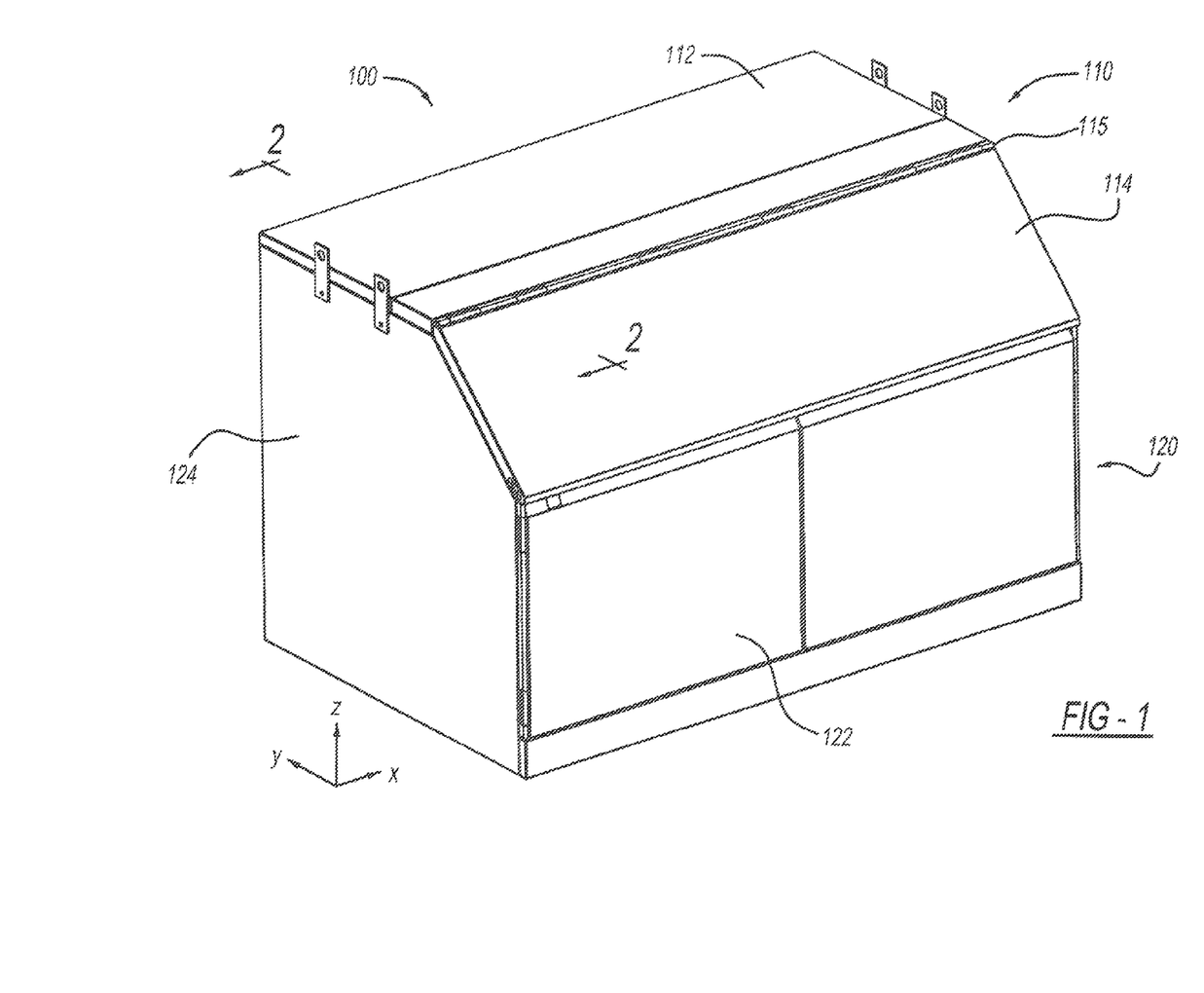
FIG. 1 is an isometric view of an enclosure in accordance with one embodiment.

Referring now to FIG. 1, an enclosure 100 (depicted in the closed position) generally includes a top (or "roof") portion 110 and a body portion (or simply "body") 120. Top portion 110 includes a lid component (or simply "lid") 114 configured to rotate with respect to body portion 120 (e.g., via a hinge 115 or other such rotational component or components) to provide access to an interior compartment of enclosure 100 (as will be shown in subsequent figures). Top portion 110 may also include a stationary roof component 112 rigidly coupled to or otherwise incorporated into body portion 120.

In the illustrated embodiment, body portion 120 is generally rectilinear and includes two opposing side portions 124 (only one visible in the figure), as well as a front portion 122 and a back portion (not shown) opposite front portion 122. Similarly, lid component 114 is depicted as a rectangular panel hingedly connected (via hinge component 115) along one full edge to stationary roof component 112. It will be appreciated, however, that the embodiments are not so limited and may include any suitable combination of rectilinear and/or curvilinear shapes.

Figure 2:
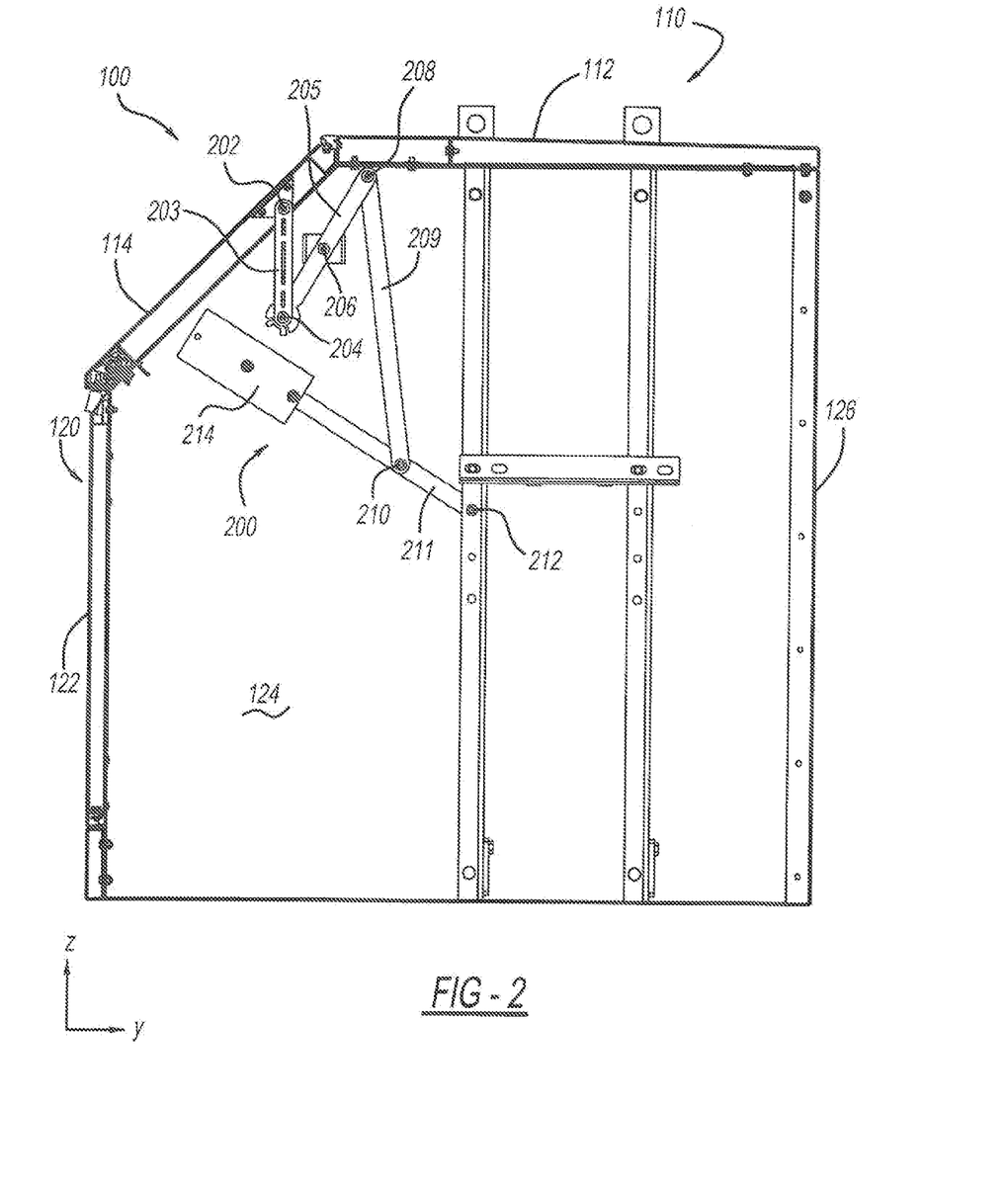
FIG. 2 is a cross-sectional view of the exemplary enclosure as depicted in FIG. 1 along section "2".

FIG. 2 is a cross-sectional view of the exemplary enclosure as depicted in FIG. 1 along section "2" (i.e., viewing to the left, along the negative x-axis of FIG. 1). In this view, the back portion 126 can be observed, in addition to side panel 124 and front portion 122. As shown, a counterweight assembly 200 is coupled between lid component 114 and body portion 120. As will be detailed below, counterweight assembly 200 is configured such that a force required for rotating lid component 114 through its travel between a closed position and a full-open position is substantially constant.

Counterweight assembly 200 may be characterized as a planar linkage mechanism including a first link 203, a second link 205, a third link 209, and a fourth link 211 joined via various pivots and forming various lever components as shown. More particularly, one end of first link 203 is rotatably coupled to lid component 114 at a pivot 202, and the opposite end is and rotatably coupled to one end of second link 205 at pivot 204. The opposite end of second link 205 is rotationally coupled to third link 209 at pivot 208. Second link 205 is also rotatably coupled to body portion 120 (e.g., a side panel 124) such that second link 205 forms a first class lever, with pivot 206 acting as the fulcrum between the force (e.g., lid-related force) resulting at pivot 204 and the force (e.g., counterweight-related force) resulting at pivot 208 by virtue of third link. 209. As shown, one end of fourth link 211 is coupled to a counterweight mass 214 (having a center of mass as indicated) while the opposite end is coupled to body potion 120 at pivot 22. One end of third link 209 is rotatably coupled to fourth link 211 at pivot 210, which lies between pivot 212 and counterweight mass 214, thereby forming a second lever component (i.e., a third class lever with pivot 212 as the fulcrum).

Figure 7:
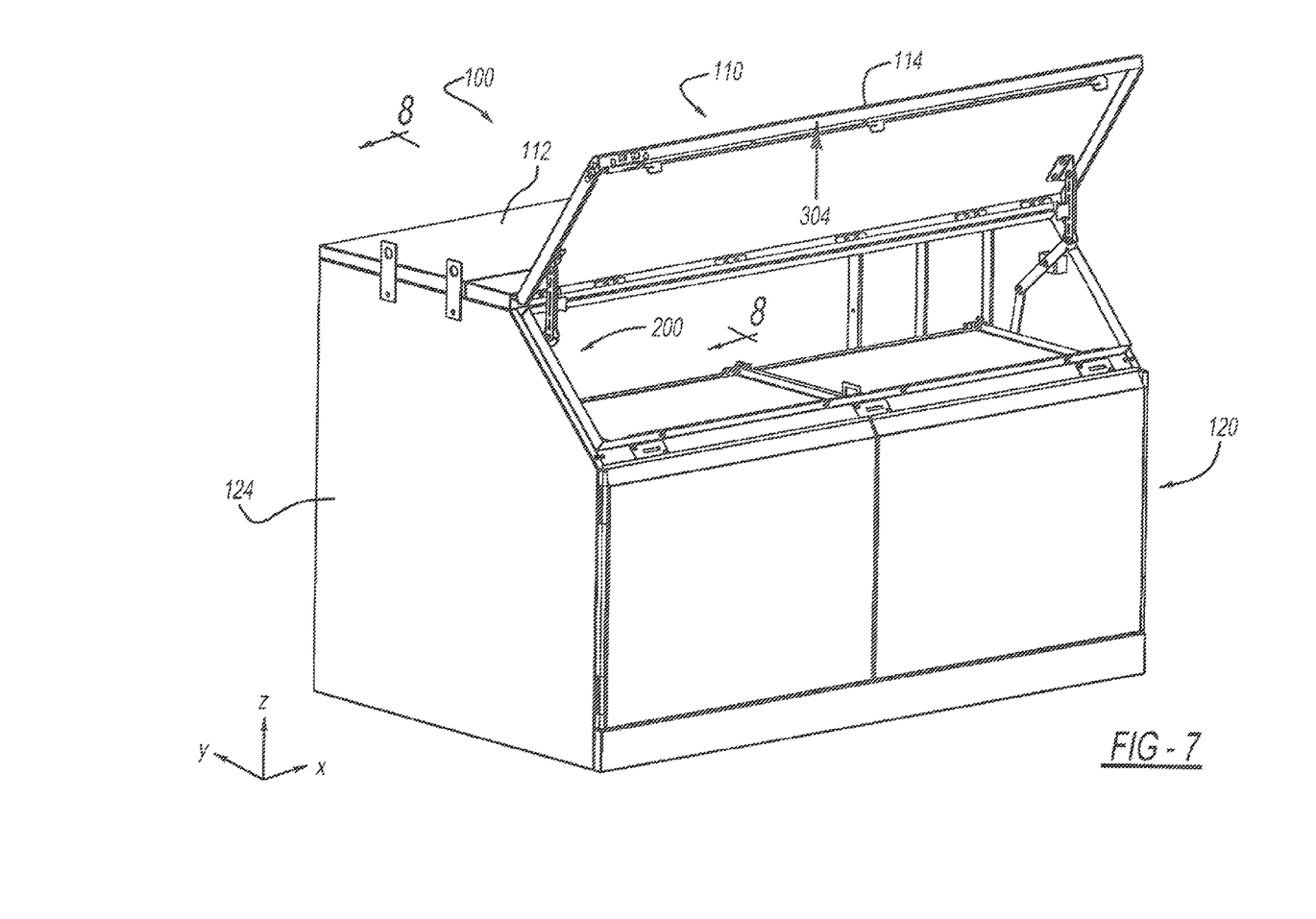
FIG. 7 is an isometric view of the exemplary enclosure with the lid portion in a full-open position.

Counterweight assembly 200 may be characterized as a planar linkage mechanism having a first class lever 205 coupled to the lid 114 through a lift link 203, a third class lever 211 coupled to the counterweight 214 and a drag link 209 interconnecting levers 205, 211. Counterweight assembly 200 may also be characterized as a pair of four-bar linkages disposed on opposite sides of a first class lever (i.e., second link 206). Specifically, one four-bar is formed by pivot 202, pivot 204, pivot 206, and the rotational component (e.g., lid hinge) 115 component, while a second four-bar linkage is formed by pivot 212, pivot 210, pivot 208, and pivot 206. The first four-bar linkage is coupled to lid component 114, and the second four-bar linkage assembly is coupled to counterweight mass 214, in accordance with the illustrated embodiment, these components are configured to counterbalance the force required (and/or to keep the force substantially constant) when lid component 114 is moved from the closed position (FIG. 2) to the full-open position (FIG. 7). The kinematic and static analysis of such four-bar linkages are known in the art, and need not be described in further detail herein.

The positions, dimensions, and initial angles of the various links and pivots shown in FIG. 2 may be selected and specified depending on a number of design factors, including the dimensions of enclosure 110, the space available for counterweight assembly 200, the weight of lid component 114, and other such factors. By way of example, the various lengths and positions illustrated in FIG. 2 may be characterized by a normalized dimension in which the distance between the third pivot 206 and the fourth pivot 208 (i.e., one arm of the lever formed by second link 205) is set to 1.0. Consistent with this normalization, in the embodiment shown in FIG. 2, the first link 203 has a length of approximately 1.4, the second link 205 has as length of approximately 2.0, the third link 209 has a length of approximately 3.6, the fourth link 211 is configured such that the distance between pivot 212 and pivot 2110 is approximately 1.1, and the distance between the fifth pivot 210 and the counterweight mass is approximately 2.2. Furthermore, the distance between the rotational axis (115 in FIG. 1) of the lid component 114 and pivot 202 is approximately 1.0, the distance between the rotational axis of the lid portion and the pivot 206 is approximately 1.2; and the distance between pivot 206 and pivot 212 is approximately 3.7. In this regard, it will be appreciated that the above dimensions are merely provided as one example for one particular enclosure design, and are not intended to be limiting.

Having thus described a counterweight assembly 200 in accordance with one embodiment, movement of the assembly will now be described in conjunction with the progression of images shown in FIGS. 3-8.

Figure 3:
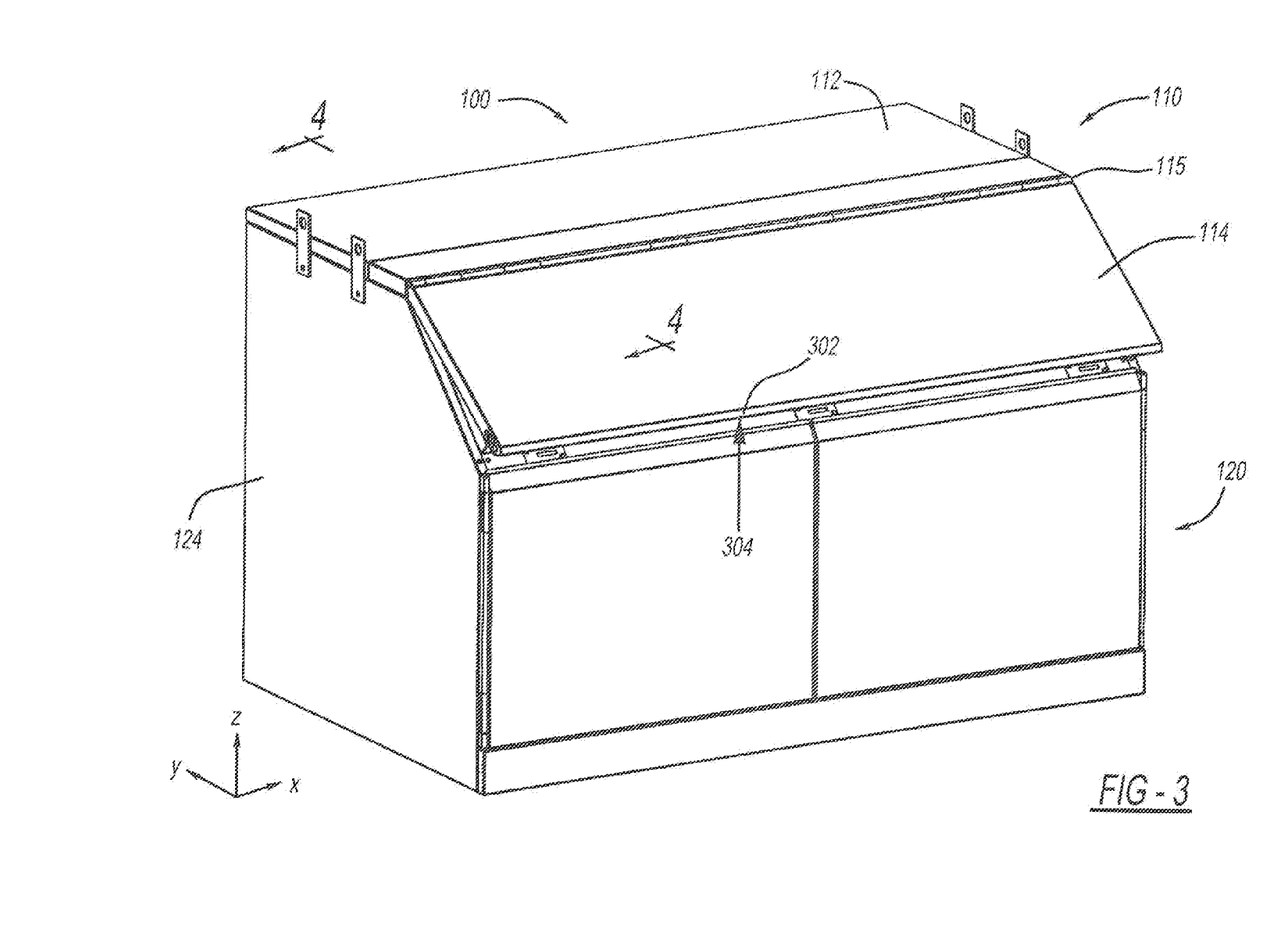
FIG. 3 is an isometric view of the exemplary enclosure with the lid portion partially opened.
Figure 4:
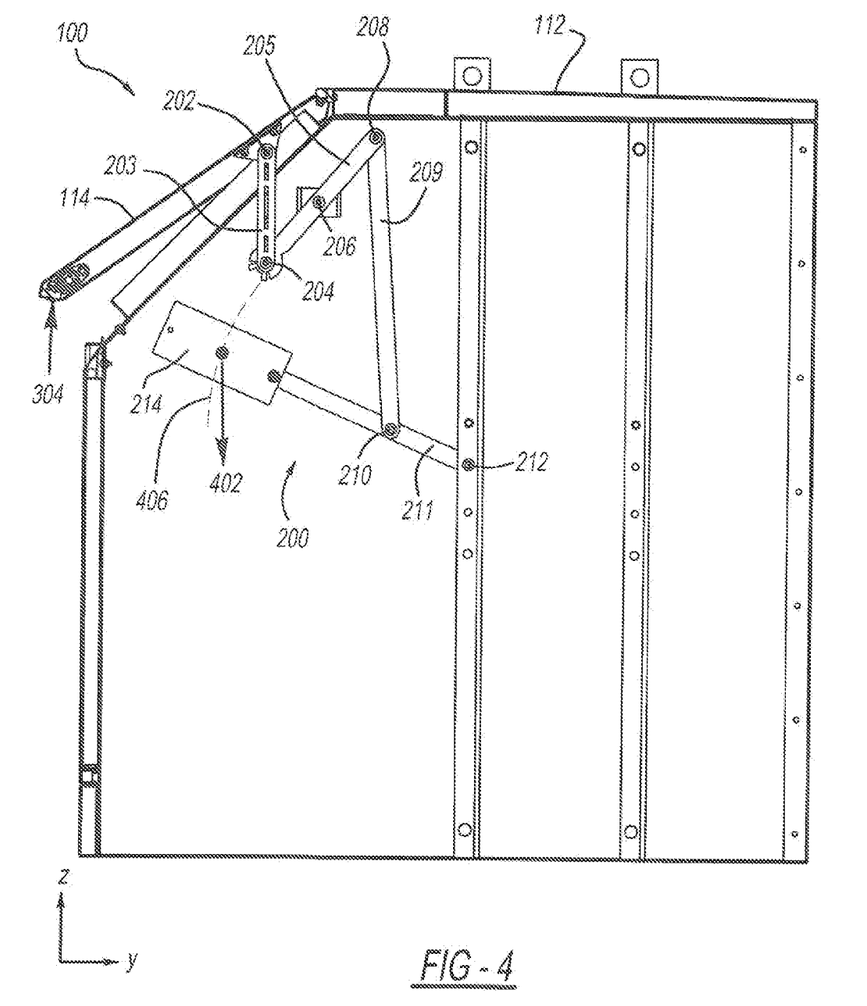
FIG. 4 is a cross-sectional view of the enclosure as depicted in FIG. 3 along section "4".

FIG. 3 is an isometric view of enclosure 100 with the lid component 114 partially opened, and FIG. 4 is a cross-sectional view of the enclosure as depicted in FIG. 3 along section "4". As shown, an opening force 304 is being applied to a region 302 of the leading edge (adjacent front portion 122) of lid component 114. During normal operation, opening force 304 may be distributed over multiple regions (e.g., being opened by multiple hands), at various positions, and/or may be applied a variety of angles—e.g., substantially vertical (e.g., parallel to the z-axis) or skewed along the x and y axes with some non-zero vertical component. Force 304 is therefore illustrated without loss of generality as a single force near the center of the front edge of lid component 114.

As a result of applied opening force 304, lid 114 has been partially rotated (by about 10 degrees) and simultaneously the various links of counterweight assembly 200 have moved along their respective paths in accordance with the constraints set by their respective pivots, in particular, it can be seen that counterweight mass 214 (which provides a corresponding force 402 as illustrated) has begun to move downward along an arc 406.

Figure 5:
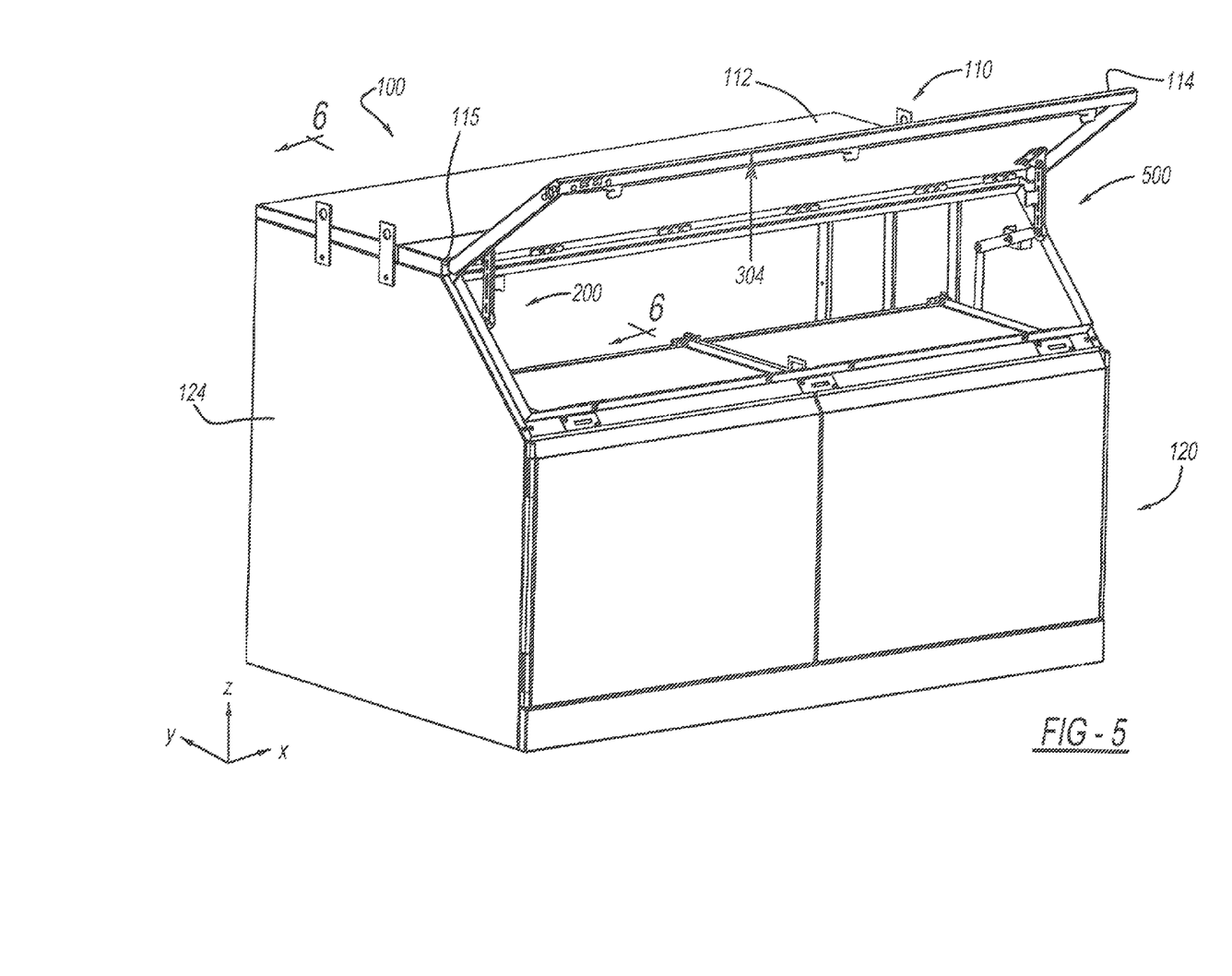
FIG. 5 is an isometric view of the exemplary enclosure with the lid portion partially opened.
Figure 6:
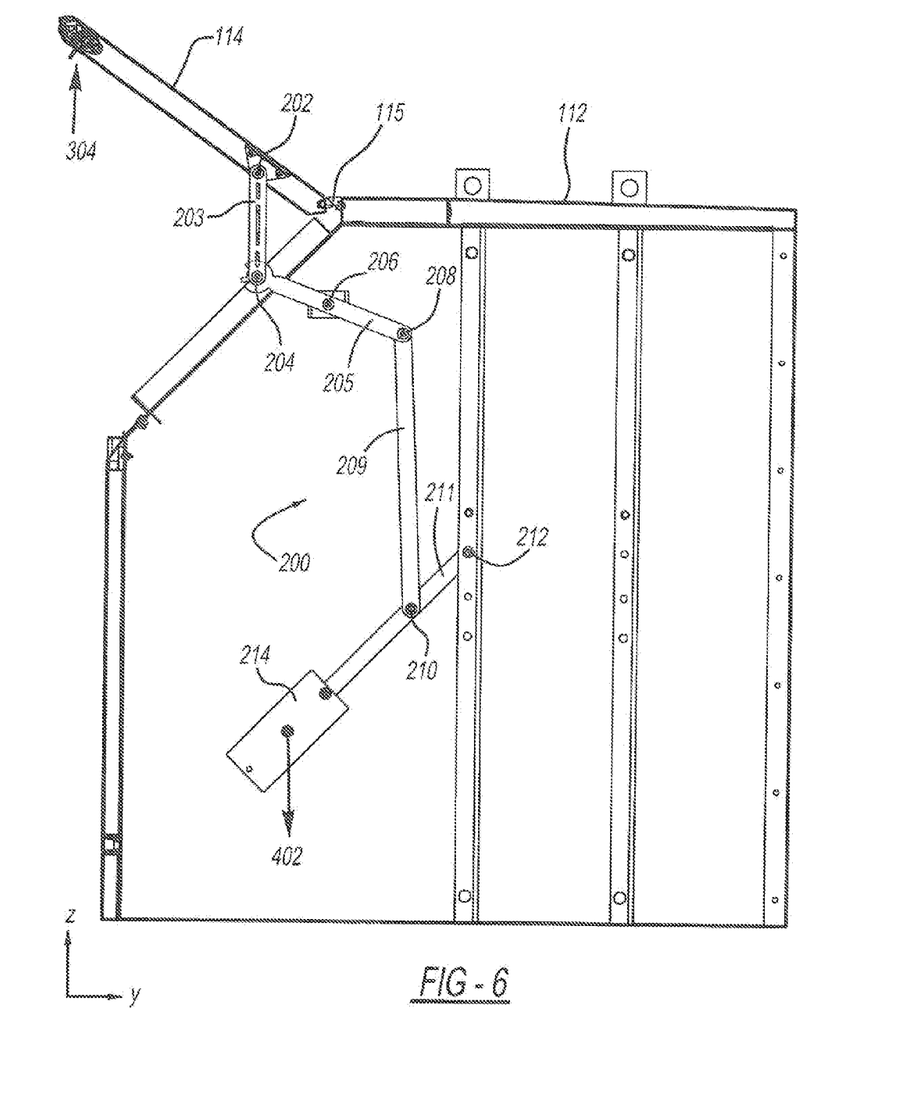
FIG. 6 is a cross-sectional view of the enclosure as depicted in FIG. 5 along section "6".

Continuing the progression, FIG. 5 is an isometric view of enclosure 100 with the lid component 114 opened to a greater extent, and FIG. 6 is a cross-sectional view of the enclosure as depicted in FIG. 5 along section "6". At this point, lid component 114 is oriented at approximately a 45-degree angle, and counterweight mass 214 is similarly oriented at an approximately 45-degree angle with respect to the horizontal (i.e., the y-axis). Thus, the orientation of link 211 has to a large extent "mimicked" or mirrored the motion of lid component 114.

FIG. 5 also illustrates an embodiment in which a second counterweight assembly 500 is provided to support lid component 114 on a side opposite that of counterweight assembly 200. That is, counterweight assemblies 200 and 500 may be secured to opposite side walls 124 of enclosure 100. In such an embodiment, the counterweight masses employed in counterweight assemblies 200 and 500 may be the same, or may be different. The latter case may be advantageous in the instance where a single individual is to lift lid component 114 by applying an opening force to one end and the lid component 114 itself has significant mass and compliance such that the opposite end dips slightly lower during opening and closing.

Figure 8:
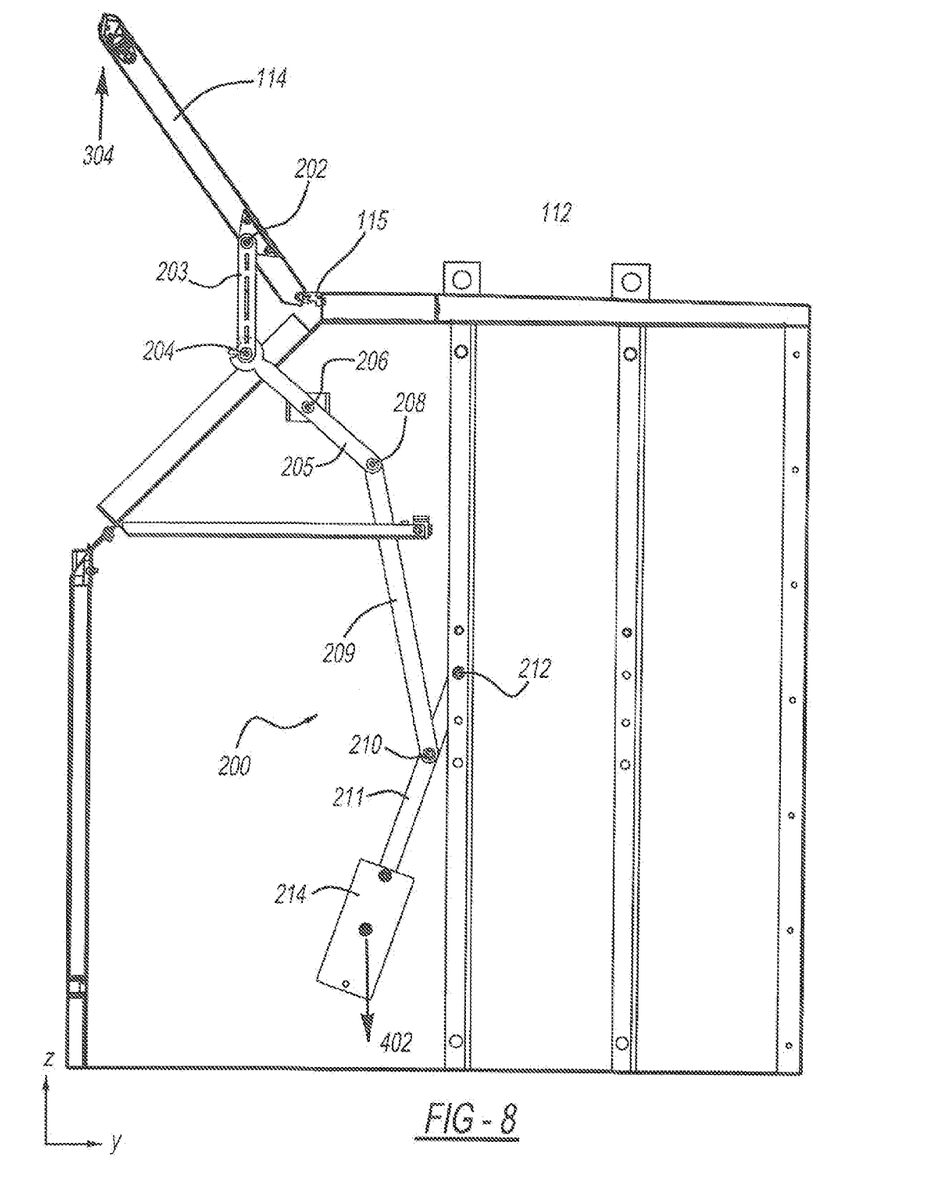
FIG. 8 is a cross-sectional view of the enclosure as depicted in FIG. 7 along section "8".

Finally, FIG. 7 is an isometric view of the exemplary enclosure with the lid portion in a full-open position, and FIG. 8 is a cross-sectional view of the enclosure as depicted in FIG. 7 along section "8". Again, it can be seen that the movement of counterweight mass 214 (and the orientation of link 211) has largely mirrored that of lid component 114.

Figure 9:
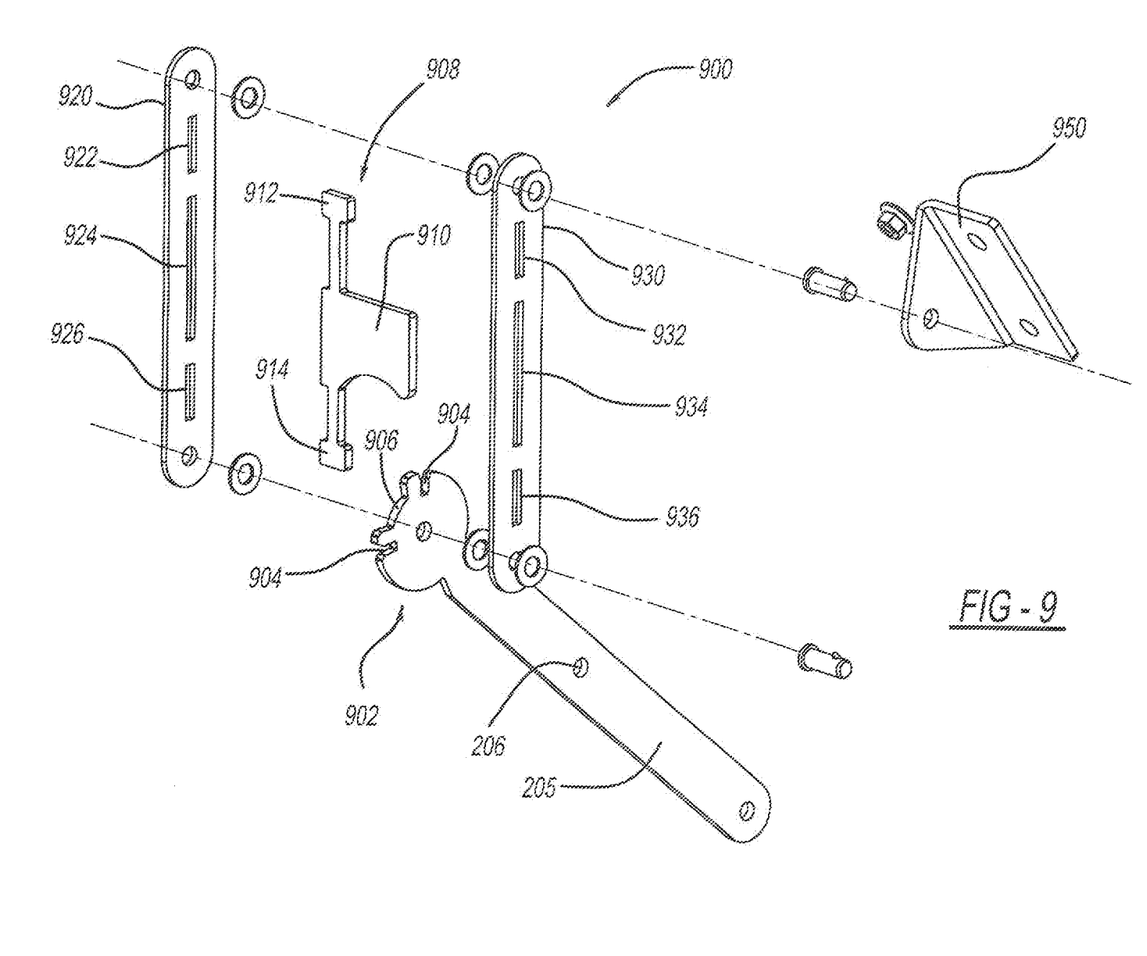
FIG. 9 is an isometric view of a latching system in accordance with one embodiment.

In accordance with various embodiments, counterweight assembly 200 also includes a latching mechanism configured to automatically lock a portion of the counterweight assembly 200 when the lid component is moved to a full-open position as illustrated in FIG. 8. For example, FIG. 9 is an isometric view of a latching system 900 in accordance with one embodiment. As shown, latching system 900 generally includes a retainer component 908 slidably retained by opposing, slotted components 920 and 930 (which together may compose link 203 of FIG. 8), which is configured to engage one or more radial slots 904, 906 provided at an end 902 of link 205 (e.g., adjacent pivot 204 of FIG. 8). Components 920 and 930 are rotatably coupled (via suitable hardware) to a bracket 950, which itself is coupled to the lid component (not illustrated), and corresponds to pivot 202 of FIG. 8.

Component 920 includes three slots, 922, 924, and 926, and component 930 includes three similarly slots 932, 934, and 936. Each of these slots is configured to restrain tabs 912, 910, and 914, respectively. In some embodiments, when components 920 and 930 reach a predetermined angle with respect to link 204, retainer component 903 falls into slot 906 due to the force of gravity. This greatly increases the ease in which an operator may lift and lock the lid component into place.

Tab 910 may include a protruding region (e.g., the downward-facing arcuate region as shown) configured to allow a user to lift retainer component 908 in a slidable fashion with respect to components 920 and 930 (as well as end 902) to disengage retainer component 908 from radial slots 904, 906.

Upon disengaging retainer component 908, the lid component may then be slowly lowered to the closed position again (corresponding to reversing the above sequence of figures). As noted above, counterweight assembly 200is configured such that the force required to rotate or lift the lid component a closed position to a full-open position is substantially constant. Similarly, the force required to counteract the closing of the lid component is also substantially constant. That is, in the absence of any applied opening force (or a force applied to counteract closing of the lid component) counterweight assembly 200 may configured to such that the lid will gradually rotate to the closed position in a relatively slow and controlled manner. In this way, a single operator may easily open, lock, unlock, and close even a relatively heavy lid used in connection with enclosures such as heavy, pad enclosures used in connection with power distribution systems.

Latching system 900 is not limited to the embodiments described above. For example, other gravity-aided latching schemes may be employed, such as a pivoting finger or "dog" that engages a tooth (ratchet-like), or a sleeve that slides down to lock two adjacent links of latching system 900. In other embodiments, a spring component or the like may be used to aid in latching (i.e., in addition to or in place of gravity-aided latching).

Multiple latching positions may be provided by latching system 900 such that a user is capable of latching the lid component 114 at multiple operational angles. Radial slot 904 provides a latching position in which the lid component 114 is in a normal operating position as shown in FIGS. 7 and 8. In this position, the lid component 114 overhangs access into the enclosure 100 to form precipitation cover providing modest protection from weather overhead. Two slots 904 are provided in the end 902 of link 205 so that the same link may be used in the counterweight assembly 200 regardless if it is located on the left-hand side or the right-hand side. A lost motion slot 906 is formed in the end 902 of link 205 between slots 904 and provides a latching position in which the lid component can be moved through a substantially vertical to a position slightly over center of hinge 115. By releasing the latch 910 over the tooth 905, the user can continue to push the lid component 114 further open with the latch 910 sliding in the lost motion slot 906. In this position, the lid component 114 can be position out of the way to provide access to the enclosure from directly above for facilitating installation of the switchgear. For example, an installer may want to access the enclosure 100 using a crane or overhead bucket with a winch from above to pull power distribution lines into the enclosure 100 from a pit or conduit run beneath the enclosure 100. The lost motion slot 906 enables wide open access for such installation.

In another embodiment, the various links, pivots, and angular relationships of counterweight assembly 200 are configured such that the top two links (203 and 205) can themselves extend beyond center (though not necessarily vertical) such that if the operator attempts to bring lid 114 down, links 203 and 205 will rotate the opposite way—i.e., away from the operator. This may be described as "going into toggle." Thus the weight of lid 114 is held because the links have a limited amount of "over travel" and they come to rest in this "over toggle" position. In accordance with this embodiment, the operator releases the assembly by pushing up on the lid while simultaneously pulling out on the links (links 203 and 205) themselves.

While at least one exemplary embodiment has been presented in the foregoing detailed description, it should be appreciated that a vast number of variations exist. It should also be appreciated that the exemplary embodiment or exemplary embodiments are only examples, and are not intended to be models or otherwise limit the scope, applicability, or configuration of the disclosure in any way. Rather, the foregoing detailed description will provide those skilled in the art with a convenient road map for implementing the exemplary embodiment or exemplary embodiments.

It should be understood that various changes can be made in the function and arrangement of elements without departing from the scope of the disclosure as set forth in the appended claims and the legal equivalents thereof.

What is claimed is:

1. A counterweight assembly for an enclosure having a lid component, the counterweight assembly comprising:
   a first planar linkage mechanism including:
      a first link having a first end and a second end, wherein the first end is rotatably coupled to the lid component at a first pivot;
      a second link having a third end and a fourth end, wherein the third end is rotatably coupled to the second end of the first link at a second pivot, and the second link is rotatably coupled to the body portion between the third end and the fourth end at a third pivot;
      a third link having a fifth end and a sixth end, wherein the fifth end is rotatable coupled to the fourth end of the second link at a fourth pivot; and
      a fourth link having a seventh end, an eighth end, and a fifth pivot therebetween, wherein the eighth end is coupled to the body potion at a sixth pivot, and the sixth end of the third link is rotatably coupled to the fourth link at the fifth pivot; and
   a first counterweight disposed on the fourth link at the seventh end, wherein the first counterweight is configured to counterbalance the weight of the lid component acting through the second link as the lid component rotates about a rotational axis from a closed position to a full-open position.

2. The counterweight assembly of claim 1, further comprising a latching mechanism configured to automatically lock a portion of the counterweight assembly when the lid component is moved to an open position.

3. The counterweight assembly of claim 2, wherein the latching mechanism comprises:
   a retainer component slideably retained by the first link; and
   a radial slot provided in the first end of the second link, the radial slot configured to accept, under the force of gravity, the retainer component when the first link and second link form a predetermined angle.

4. The counterweight assembly of claim 1, wherein, in normalized dimensions:
   the distance between the third pivot and the fourth pivot is approximately 1.0;
   the first link has a length of approximately 1.4;
   the second link has as length of approximately 2,0;
   the third link has a length of approximately 3.6;
   the fourth link is configured such that the distance between the sixth pivot and the fifth pivot is approximately 1.1, and the distance between the fifth pivot and the center-of-mass of the counterweight mass is approximately 2.2;
   the distance between the rotational axis of the lid portion and the first pivot is approximately 1.0;
   the distance between the rotational axis of the lid portion and the third pivot is approximately 1.2; and
   the distance between the fourth pivot and the sixth pivot is approximately 3.7.

5. The counterweight assembly of claim 1, further comprising a second planar linkage mechanism coupled between the lid component and the body portion, wherein the first planar linkage mechanism is coupled to a first side wall of the body portion, and the second planar linkage mechanism is coupled to a second side wall of the body portion opposite the first side wall of the body portion.

6. The counterweight assembly of claim 5, further comprising a second counter weight disposed on the second planar linkage mechanism, wherein a mass of the first counterweight is greater than a mass of the second counterweight.

7. The counterweight assembly of claim 1, wherein the counterweight mass is adjustable to accommodate the mass and center-of-mass of the lid component.

8. A counterweight assembly for an enclosure having a body portion and a user-actuable lid component, the counterweight assembly comprising:
   a first class lever component having a first end, a second end, and a fulcrum rigidly coupled to the body portion;
   a first linkage coupled between the lid component and the first end of the first class lever component, the first linkage including a first link having a first end rotatably coupled to the lid component, a second end rotatably coupled to the first class lever component, and a latching mechanism configured to lock the first link to the first class lever component when the lid portion is moved to a full-open position; and
   a counterweight mass disposed on a second linkage and coupled, through the second linkage, to the second end of the first class lever component;
   wherein the counterweight mass, the first linkage, the second linkage, and the first class lever component are configured to counterbalance a force required to rotate the lid component from a closed position to a full-open position.

9. The counterweight assembly of claim 8, wherein the latching mechanism comprises:
   a retainer component slideably retained by the first link; and;
   a radial slot provided in a first class lever component, the radial slot configured to accept, due to the force of gravity for defining a normally open position.

10. The counterweight assembly of claim 9, wherein the latching mechanism further comprises a lost motion slot provided in the first class lever component for defining a fully open position.

11. The counterweight assembly of claim 8, wherein the counterweight mass is adjustable to accommodate the mass and center-of-mass of the lid component.

12. A counterweight assembly for an enclosure having a body portion and a user-actuable lid component, the counterweight assembly comprising:
   a first link having a first end and a second end, wherein the first end is rotatably coupled to the lid component at a first pivot;
   a second link having a third end and a fourth end, wherein the third end is rotatably coupled to the second end of the first link at a second pivot, and the second link is rotatably coupled to the body portion between its first end and the fourth end at a third pivot;
   a third link having a fifth end and a sixth end, wherein the fifth end is rotatably coupled to the fourth end of the second link at a fourth pivot; and
   a fourth link having a seventh end, an eighth end, and a fifth pivot therebetween, wherein the seventh end is coupled to a counterweight mass, the eighth end is coupled to the body potion at a sixth pivot, and the sixth end of the third link is rotatably coupled to the fourth link at the fifth pivot;
   wherein the first link, the second link, the third link, the counterweight mass, and the fourth link are configured to counterbalance a force required to rotate the lid component about a rotational axis from a closed position to a normally open position.

13. The counterweight assembly of claim 12, further including a latching mechanism configured to lock the first link to the second link at the second pivot when the lid portion is moved to the normally position.

14. The counterweight assembly of claim 13, wherein the latching mechanism comprises:
   a retainer component slideably retained by the first link; and;
   a radial slot provided in the first end of the second link, the radial slot configured to accept, due to the force of gravity, the retainer component when the first link and the second link form a predetermined angle.

15. The counterweight assembly of claim 14, wherein the retainer component includes a protruding region configured to allow a user to lift the retainer component in a slidable fashion with respect to the first link to disengage the retainer component from the radial slot.

16. The counterweight assembly of claim 15, wherein the counterweight mass is selected such that the lid will gradually rotate to the closed position when no lifting force is applied to the lid.

17. The counterweight assembly of claim 12, wherein the counterweight mass is adjustable to accommodate the mass and center-of-mass of the lid component.

\* \* \* \* \*